United States Patent [19]

Heisler

[11] 4,302,145
[45] Nov. 24, 1981

[54] AUTOMATIC DRAWBRIDGE FOR ELEVATOR

[75] Inventor: William C. Heisler, Monroe, N.C.

[73] Assignee: The Peelle Company, Bay Shore, N.Y.

[21] Appl. No.: 95,358

[22] Filed: Nov. 19, 1979

[51] Int. Cl.³ .............................................. E04H 6/06
[52] U.S. Cl. .................................... 414/608; 414/661; 414/539; 187/98
[58] Field of Search .......... 187/3, 98, 52 LC, DIG. 1, 187/8.77; 414/659, 537, 260, 259, 280, 277, 241, 253, 259, 341, 608, 611, 661, 239, 240, 499, 525 R; 49/303, 467, 70; 14/71.1; 312/281, 282; 104/44, 48

[56] References Cited
U.S. PATENT DOCUMENTS

| | | | |
|---|---|---|---|
| 1,152,012 | 8/1915 | Doren | 187/98 |
| 1,763,858 | 6/1930 | Peelle | 187/98 |
| 2,473,127 | 6/1949 | Alexander | 187/98 |
| 3,190,395 | 6/1965 | Lill | 14/71.1 |
| 3,327,650 | 6/1967 | Bridges et al. | 14/71.1 |
| 3,337,070 | 8/1967 | Guilbert, Jr. | 414/659 |
| 3,396,822 | 8/1968 | Guilbert, Jr. | 187/98 |
| 3,447,704 | 6/1969 | Guilbert, Jr. | 414/659 |

Primary Examiner—Robert J. Spar
Assistant Examiner—Kenneth Noland
Attorney, Agent, or Firm—Pearne, Gordon, Sessions, McCoy & Granger

[57] ABSTRACT

A drawbridge assembly on an elevator car which is responsive to movement of an automatic cart loader and unloader for its extension and retraction. The drawbridge compensates for expected positional variations in indexing of the elevator to a selected landing. An associated clutch permits manual deployment of the drawbridge during a power failure or other malfunction.

13 Claims, 9 Drawing Figures

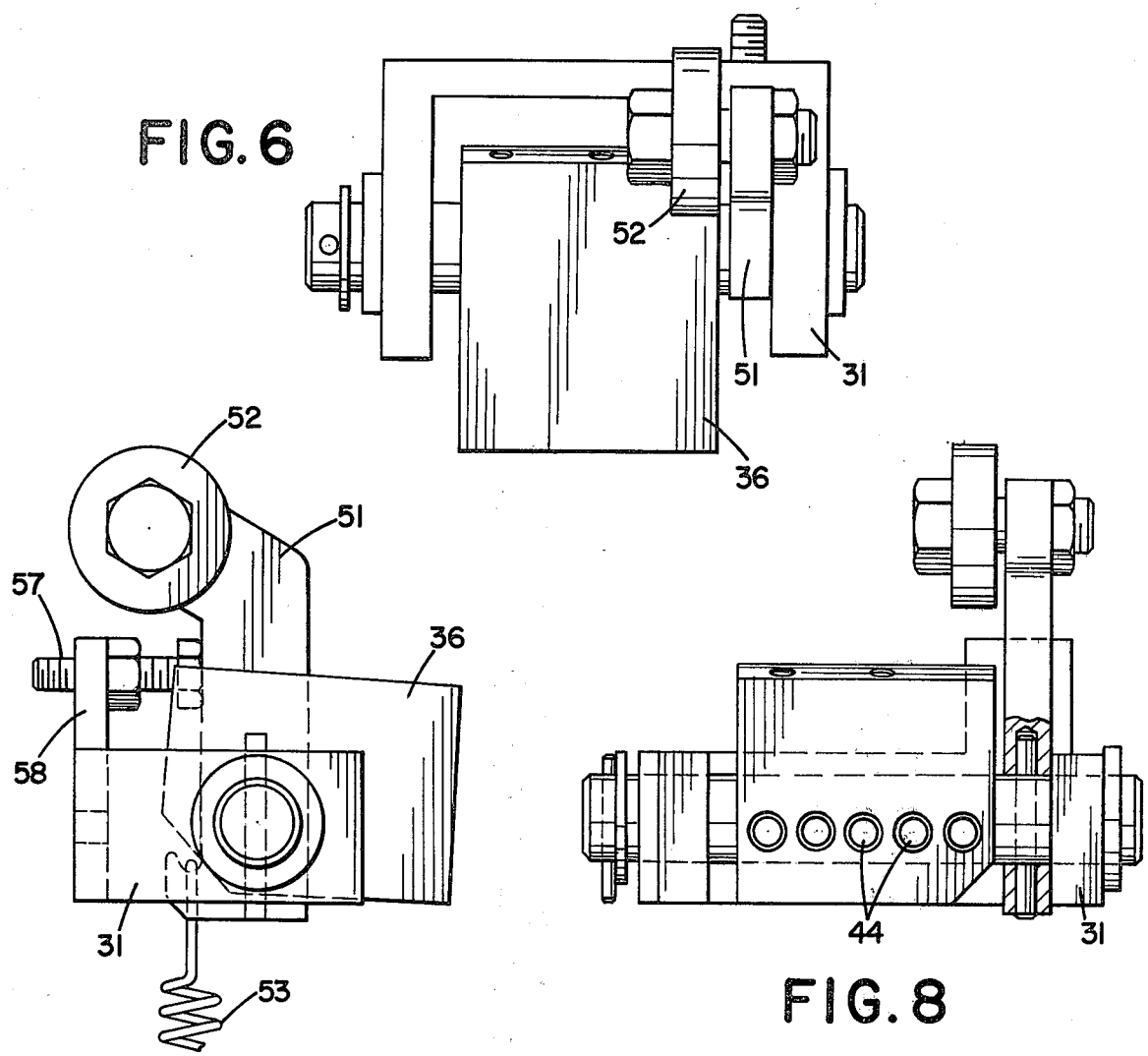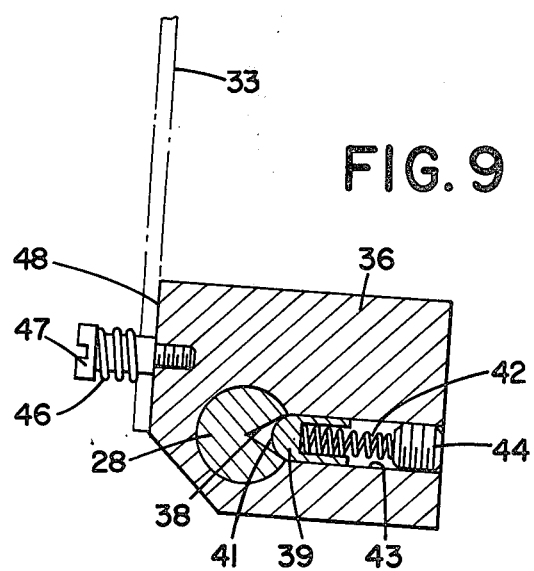

AUTOMATIC DRAWBRIDGE FOR ELEVATOR

BACKGROUND OF THE INVENTION

The invention relates to material handling devices, and in particular involves improvements in automatic elevator loading and unloading devices.

PRIOR ART

Elevators, particularly those employed in material handling, ordinarily index to a building floor or other landing within some positional variation or tolerance so that the floor of the elevator car comes to a rest at a level somewhat higher or lower than the landing. In the prior art, drawbridges have been proposed to span any differential between car floor and landing levels up or down. In the manner of a ramp, a drawbridge facilitates the loading and unloading of carts or other trucking to and from the elevator car. The function of such a drawbridge is particularly useful where carts are provided with relatively small wheels or casters so that the positional tolerance of the car indexing is a substantial fraction of the diameter of a cart's wheels. In many systems, such as disclosed in U.S. Pat. Nos. 1,763,858 to Peelle and 3,396,822 to Guilbert, Jr., drawbridges have been operated in response to elevator door opening and closing movement.

SUMMARY OF THE INVENTION

The invention comprises a drawbridge assembly on an elevator car which is arranged to extend and retract across the edge of the car and sill of a landing in response to loading and unloading movement of a cart transfer device associated with the car.

As disclosed, the drawbridge assembly is ordinarily powered by the cart transfer device through an actuator associated with the assembly. The actuator includes an element disposed in the path of the transfer device whereby extension or retraction of the transfer device causes a corresponding displacement of a drawbridge plate. The drawbridge actuator is arranged to develop a sufficient displacement amplitude in the drawbridge plate to account for any expected positional variations in the indexing action of the elevator car. Where an indexed car position requires a lesser amplitude of drawbridge extension, the differential between displacement of the actuator and the drawbridge plate is taken up by a resilient mounting of the drawbridge plate.

In accordance with the invention, the actuator assembly includes a releasable coupling which permits the drawbridge assembly to be manually operated in the event of a power failure or other malfunction. The releasable coupling, further, prevents excessive forces from being developed in the drawbridge assembly where the plate encounters an obstruction during its extension.

In the disclosed embodiment of the drawbridge assembly, the drawbridge plate extends and retracts by pivotal movement about a horizontal axis. Extension of the drawbridge is caused directly by forces developed by the carriage while retraction of the drawbridge is produced by a return spring biasing the drawbridge to its retracted position. The releasable coupling between the actuator and drawbridge plate has a predetermined torque capacity and uncouples in the manner of a detent when such capacity is exceeded either by manual intervention or when the drawbridge plate encounters an obstruction. The torque capacity setting of the drawbridge coupling is below that developed by the return spring, thereby enabling the return spring, holding certain elements in position, to assist in disengaging the coupling. The drawbridge, further, is arranged to reset from a manually disengaged condition to automatic operation upon re-energization of the transfer device.

BRIEF DESCRIPTION OF THE DRAWINGS

FIG. 6 is a plan view of the drawbridge actuator;

FIG. 7 is a side elevational view of the drawbridge actuator;

FIG. 8 is a front elevational view of the drawbridge actuator; and

FIG. 9 is a cross sectional view of a clutch block of the drawbridge actuator.

DETAILED DESCRIPTION OF THE PREFERRED EMBODIMENT

Figure 1:
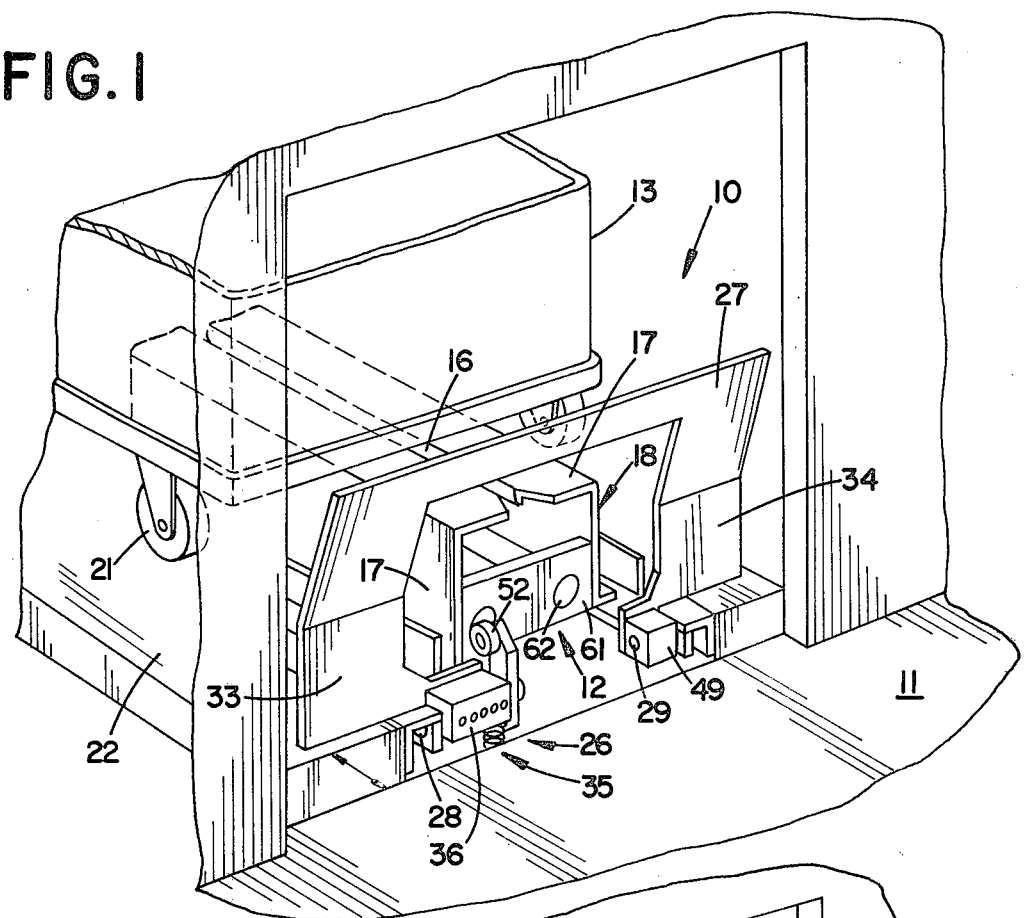
FIG. 1 is a perspective view of an elevator car with a cart loaded thereon and a drawbridge assembly embodying the invention in a retracted position.

An elevator car 10 is vertically movable in a shaft and is indexable with successive landings or floors, a typical landing being indicated at 11. Apparatus for automatically raising, lowering, and indexing the elevator car 10 is well known in the art and, since it forms no part of the invention, is not disclosed herein. Ordinarily, such automatic positioning apparatus is designed to index the car 10 with a landing 11 within a positional tolerance of, for example, three-quarters inch above or below the level of the landing sill. Transfer devices for automatically loading and unloading a cart 13 between a landing and the elevator car are also known in the art. A suitable loader and unloader or transfer device for use in conjunction with the present invention is shown in my U.S. Pat. No. 4,148,404, the disclosure of which is incorporated herein by reference. A transfer device 12 on the elevator car 10 has associated with it suitable electrical or like controls for activating it at appropriate times to load or unload a cart on the car 10. As disclosed in my U.S. Pat. No. 4,148,404, to manipulate the cart 13, the transfer device 12 grips pins (not shown) depending from the bottom of the cart. Such pins travel within a slot 16 formed between elongate members 17 on a carriage 18. A typical cart 13 is provided with casters 21, allowing it to be rolled on and off a floor 22 of the elevator car 10.

Mounted on the elevator car 10 is a drawbridge assembly 26 adapted to span any gap between the car floor 22 and the sill of the landing 11 so as to operate as a ramp to support the cart wheels 21 and allow smooth rolling transfer of the cart between the car and landing. The drawbridge assembly 26 includes a U-shaped plate 27 pivotal about a horizontal axis defined by coaxially arranged, spaced stub shafts 28 and 29. The shaft 28 is rotatably journaled on its axis in a U-shaped bracket 31 (FIG. 6), which is fixed on the elevator car 10. The other stub shaft 29 is carried in a block 32, also fixed to the elevator car 10. The horizontal shafts 28, 29 are perpendicular to a line of transfer motion of a cart 13 as it is guided horizontally by the elongate carriage members 17.

Figure 2:
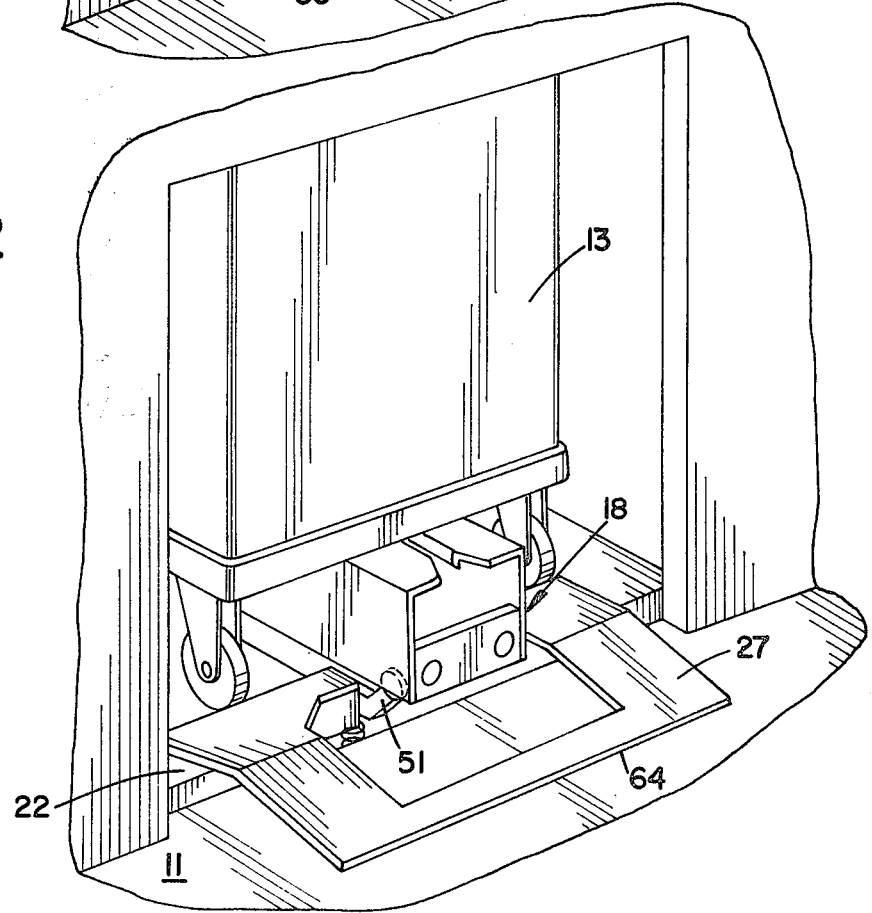
FIG. 2 is a perspective view similar to FIG. 1 illustrating the cart in an intermediate position and the drawbridge assembly extended for loading or unloading.

Legs 33, 34 of the drawbridge plate 27 are disposed in the path of the cart casters 21 so as to adequately support the cart 13 when the drawbridge is in an extended position, as indicated in FIG. 2. The drawbridge assembly 26 moves between the generally vertical retracted position of FIG. 1 to the generally horizontal, extended position of FIG. 2 by pivotal displacement about the axis of the stub shafts 28, 29. Elements of the drawbridge assembly 26 which control this pivotal movement of the drawbridge plate 27 are described hereinbelow.

Assembled on the shaft 28 is a clutch assembly or detent 35 to which the drawbridge plate leg 33 is mounted. The clutch assembly 35 includes a block 36 formed with a cylindrical bore 37 through which the associated stub shaft 28 extends. With particular reference to FIG. 9, the stub shaft 28 has a V-shaped slot 38 axially extending within the clutch block 36. Assembled within the block 36 is a clutch bar 39, which operates as a detent with the slot 38. The clutch bar 39, which extends the length of the clutch block 36, has a rounded face 41 resiliently biased into the shaft slot 38 by a plurality of compression springs 42 spaced along the length of the block. Each spring 42 is adjustably compressed in a receiving bore 43 in the block 43 by an associated screw 44. As more fully explained hereinbelow, the clutch assembly 35 releasably, torsionally couples the drawbridge plate 27 to the shaft 28.

The drawbridge leg 33 is resiliently coupled to the clutch block 36 by a pair of compression springs 46 and associated shoulder screws 47. As indicated, for example, in FIG. 9, the shoulder screws 47 and compression springs 46 are dimensioned to resiliently hold the underside of the drawbridge leg 33 against a planar face 48 of the clutch block 36. The opposite drawbridge leg 34 is secured to an associated block 49, which is pivotal on the related stub shaft 29.

An actuator arm 51 is pinned or otherwise fixed to the rotatable stub shaft 28. This arm 51, having a dog leg configuration, includes a follower roller 52 at its free end. A tension spring 53 adjustably anchored on a bolt 54 carried on a bracket 55 is fixed to the elevator car 10 and has its upper end hooked on an extension 56 of the actuator arm 51 on a side of the shaft 28 opposite the roller 52. The tension spring 53 biases the follower arm 51 and, normally, the drawbridge plate 27 to its upright retracted position by applying a torsion force to the shaft 28. The upward limit of the retracted position of the arm 51 is determined by an adjustable stop screw 57 threaded in a bracket 58 fixed to the elevator car 10. In the retracted position, the drawbridge plate 27 is completely within the vertical shaft.

Figure 3:
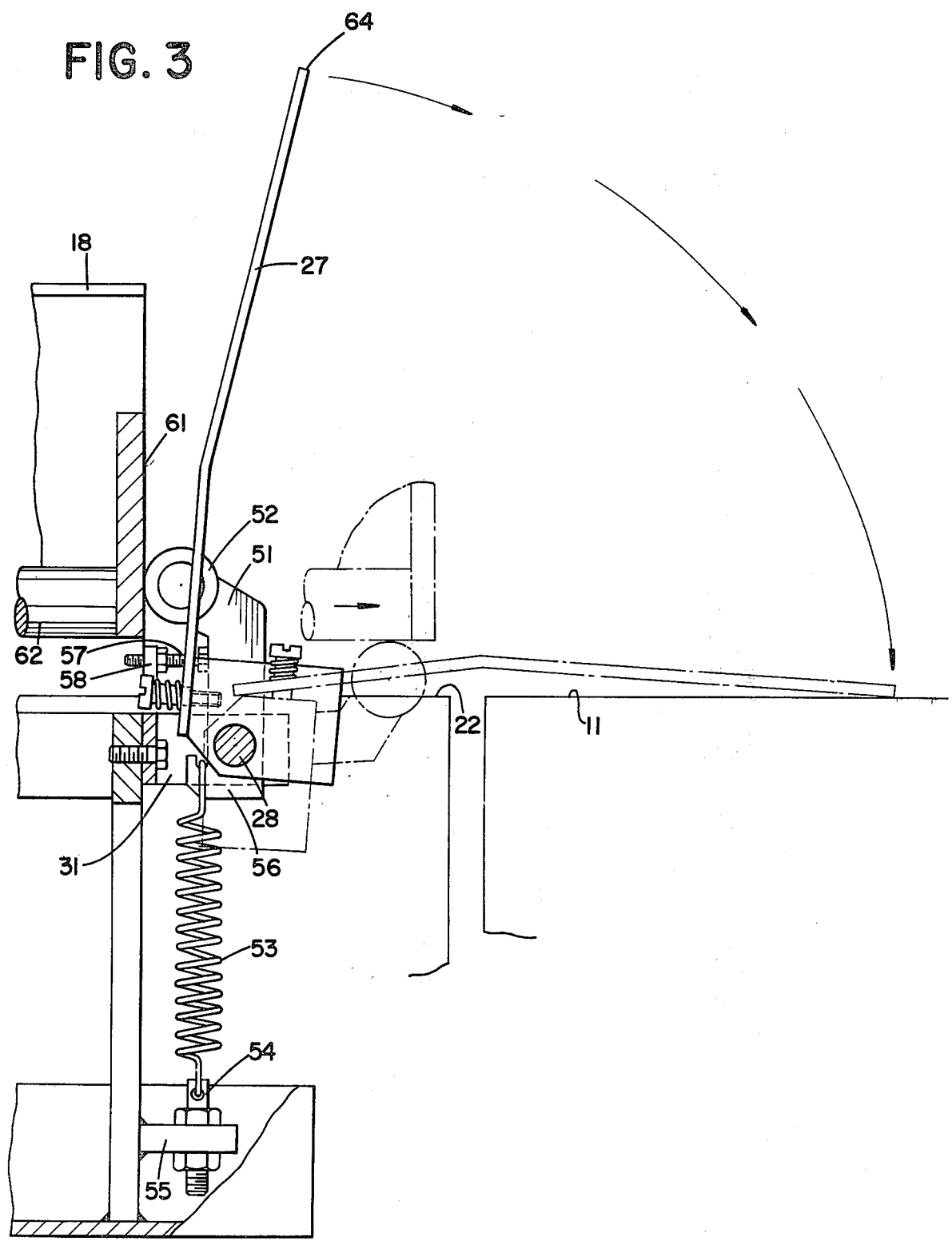
FIG. 3 is a fragmentary, somewhat schematic side view of the drawbridge assembly and an associated actuator.

The follower roller 52 is disposed in the path of a vertical end plate 61 of the transfer carriage 18. With the carriage 18 retracted, as indicated in FIG. 3, the actuator arm can assume its upper retracted position. Upon extension of the carriage 18, as indicated in phantom in FIG. 3, to pick up or discharge a cart 13, the drawbridge 27 is automatically driven to an extended position by operation of the carriage on the follower roller 52. The follower roller 52 is cammed vertically downwardly over the vertical end plate surface 61 until it passes beneath this plate and engages a guide bar surface 62 which extends as part of the carriage 18. Once the follower roller 52 has slipped beneath the carriage end plate 61, further extension of the carriage 18 does not produce additional rotation of the actuator arm 51 and drawbridge 27, since the horizontal undersurface of the guide bar 62 moving horizontally cannot further displace the follower roller 52. The various elements, including the actuator arm 51 and drawbridge plate 27, are proportioned to result in full extension of the drawbridge plate in a generally horizontal plane extending beyond the elevator shaft when the follower roller 52 first contacts the undersurface of the guide bar. When the carriage 18 retracts, the follower roller 52 reverses its path along the undersurface of the guide bar 62 and face of the carriage end plate 61 with a corresponding reverse rotation of the actuator arm 51 and retraction of the drawbridge plate 27 from the extended horizontal position to the retracted vertical position.

Ordinarily, the elevator car 10 indexes to a landing 11 with some positional tolerance in the height of the car floor 22 relative to the landing. A typical positional range, for example, would be within three-quarter inch above or below the actual level of the landing. It will be understood that extension of the carriage 18 forcibly drives the actuator arm 51, shaft 28, and clutch block 36 through the same angular displacement each time regardless of the relative heights of the elevator car floor 22 and landing 11. The various elements of the actuator and drawbridge assembly 26 are configured such that when the elevator car comes to a rest position with its floor at a maximum expected distance higher than the landing sill, the drawbridge plate 27 is rotated sufficiently that its free end, designated 64, reaches the sill or floor on the landing 11. However, where the car floor 22 indexes to a point closer to the actual level of the landing 11 than the maximum expected distance above it, or to a point below the actual landing level, less angular displacement of the drawbridge plate 27 is required to contact its free edge 64 with the sill. Any reduction from the constant full angular displacement of the actuator arm 51, shaft 28, and clutch block 36 to that required by the drawbridge plate 27 to meet the sill is taken up by compression of the springs 46.

Figure 4:
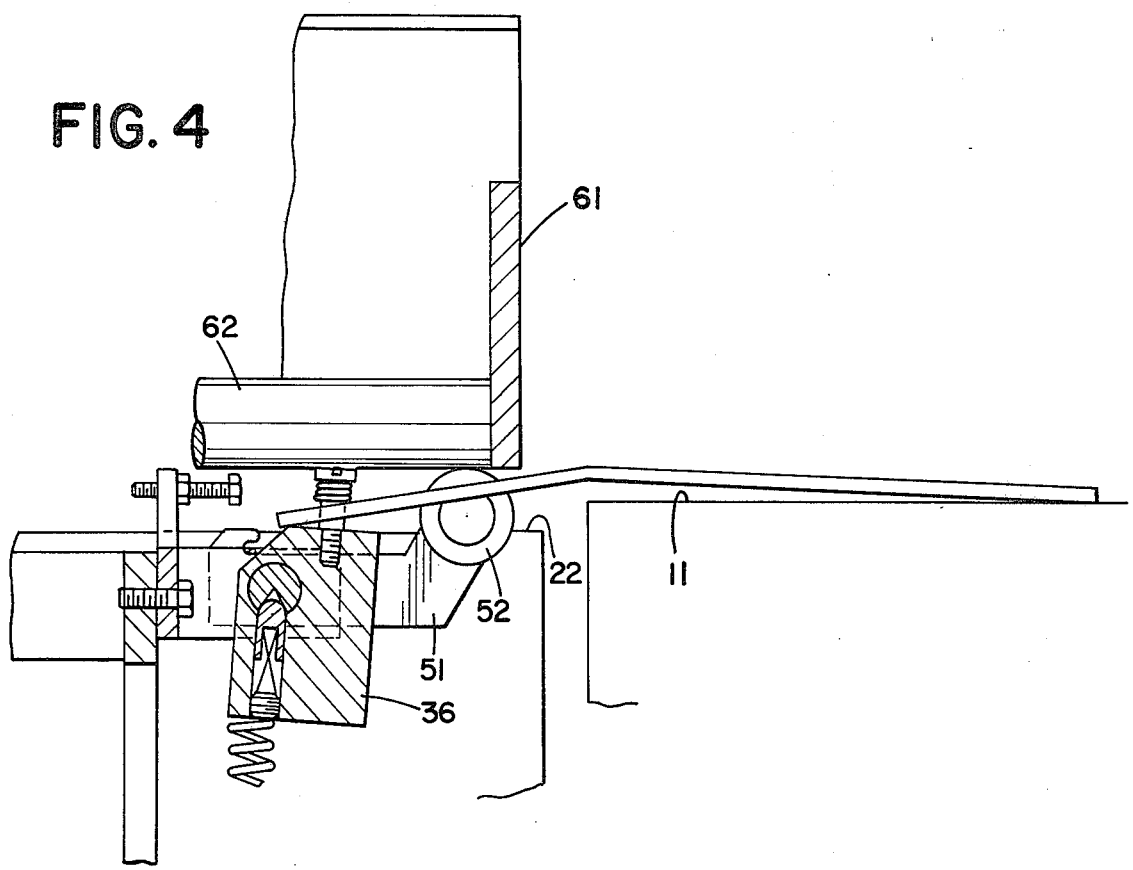
FIG. 4 is a view similar to FIG. 3, with the drawbridge assembly in an extended position and the floor of the elevator car somewhat below the level of a landing.

FIG. 3 illustrates the condition where the floor 22 is level with the landing 11, while FIG. 4 illustrates the case where the floor is lower than the landing 11. Inspection of FIGS. 3 and 4 reveals that the springs 46 are resiliently compressed from their normal or rest state in the retracted position of the drawbridge plate 27. In FIG. 4, the springs 46 are further compressed than in the condition of FIG. 3 to accommodate a minimum angular rotational displacement of the drawbridge plate 27 from its retracted position.

Figure 5:
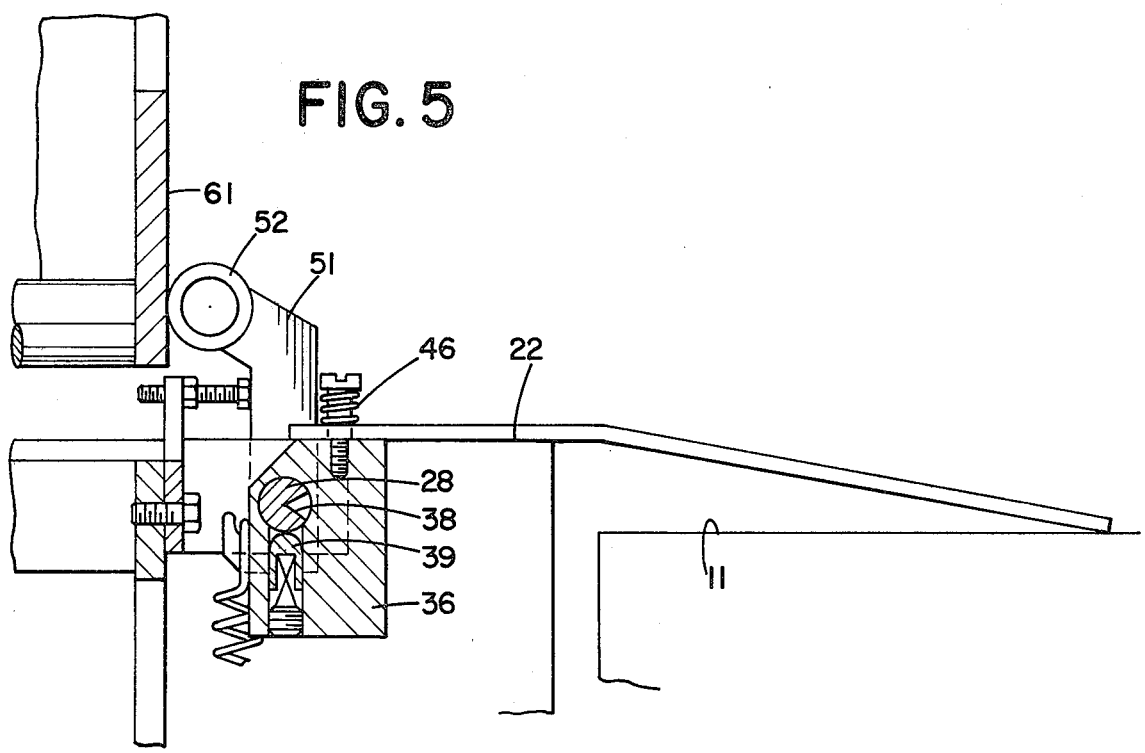
FIG. 5 is a view similar to FIGS. 3 and 4, but with the drawbridge assembly manually operated and with the floor of the elevator somewhat higher than the level of the landing.

Under abnormal conditions, such as during a power failure, it is desirable to manually operate the drawbridge assembly 26. The clutch assembly 35 allows the drawbridge plate 27 to be manually turned relative to the shaft 28 and actuator arm 51. With reference to FIG. 5, a manually applied force on the drawbridge plate 27 and resultant torque on the clutch block 36 cause the clutch bar 39 to be driven out of the V-slot or notch 38 of the shaft 28 by a camming action beneath the rounded surface 41 and the surfaces of the V-slot. Once the clutch bar 39 is out of the V-slot 38, the drawbridge plate 27 and block 36 are free to turn independently of the angular position of the shaft 28. The clutch bar springs 42 are adjusted to permit the clutch bar 39 to release itself from the slot 38 upon manual rotation of the drawbridge plate 27 at a torque level below that which is developed on the shaft 28 by the tension spring 53 so that the return spring becomes ineffective during manual operation. It will be understood that where the drawbridge assembly 26 has been manually extended and the automatic system of the transfer device 12 is returned to operation, extension of the carriage 18 will, through rotation of the actuator arm 51 and shaft 28, automatically cause the clutch bar 39 to be re-engaged with the shaft slot 38 so that the operation of the drawbridge assembly 26 will thereafter return to automatic operation. The torque limiting connection afforded by the clutch assembly or detent 35 between the actuator 51 and drawbridge plate 27 additionally provides a safety function by preventing the development of excessive force on the drawbridge during extension of the carriage. When the drawbridge plate 27 encounters abnormal resistance during its extension, the clutch assembly will automatically disengage.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. In one contemplated modification of the invention, for example, where it is desired to dispose the drawbridge at a point somewhat further from the carriage 18 than the illustrated condition, the actuator arm and drawbridge assembly can be disposed on separate horizontally spaced shafts with an appropriate mechanical linkage therebetween. Where the car 10 and transfer device 12 are capable of loading and unloading from opposite sides of the car, a pair of drawbridge assemblies may be provided on the car.

What is claimed is:

1. In an elevator system comprising a car vertically movable in a shaft between successive landings and including a floor indexable with such landings, the car having an automatic cart loader and unloader including a movable cart transfer device, a drawbridge mounted on the car and movable between a retracted position substantially entirely within the shaft and an extended, generally horizontal position laterally beyond the shaft, the drawbridge being constructed and arranged to bridge any gap between the floor of the car and an adjacent landing, actuator means on the car directly responsive to loading and unloading and movement of the cart transfer device to extend and retract the drawbridge, said actuator means being constructed and arranged to transmit mechanical energy from said transfer device during movement thereof to said drawbridge for extension of the landing.

2. An elevator system as set forth in claim 1, wherein said actuator means includes a cam follower member arranged to cooperate with cam surface means on said transfer device to develop a mechanical force to extend and retract said drawbridge.

3. An elevator system as set forth in claim 2, including spring biasing means arranged to bias said drawbridge to its retracted position.

4. An elevator system as set forth in claim 2, including means resiliently connecting said drawbridge to said actuator means, said resilient connecting means permitting said drawbridge to extend to variable positions dependent upon the relative levels of said elevator floor and said adjacent landing.

5. An elevator system as set forth in claim 4, wherein said cam follower produces a physical displacement of said actuator means corresponding to a maximum extension of said drawbridge, said resilient connecting means permitting said drawbridge to extend from said retracted position to a position short of said maximum extension.

6. An elevator system as set forth in claim 2, including releasable coupling means operably interposed between said actuator means and said drawbridge, said releasable coupling means limiting the mechanical forces transmitted to said drawbridge by said actuator means.

7. An elevator system as set forth in claim 6, wherein said releasable coupling means is constructed and arranged to permit said drawbridge to be manually operated substantially independently of said actuator means.

8. An elevator system as set forth in claim 7, including spring biasing means arranged to forcibly bias said drawbridge to its retracted position, said releasable coupling means being constructed and arranged to release said drawbridge from influence of said actuator means at a force level below that developed by said spring biasing means.

9. A drawbridge assembly for an elevator system having an automatic cart transfer which extends and retracts horizontally on an elevator car, the assembly including a drawbridge plate, means for mounting the plate on the car for pivotal movement about a horizontal axis perpendicular to the line of movement of the transfer device from a generally vertical retracted position and a generally horizontal extended position, actuator means operably connected to said drawbridge plate to control the movement of said drawbridge plate between said extended and retracted positions, said actuator means including a member positioned in the path of a traversing surface associated with said transfer device and arranged to be physically displaced by said traversing surface, and means for converting displacement of said displaceable member into pivotal displacement of said drawbridge plate.

10. A drawbridge assembly as set forth in claim 9, including means operably interposed between said displaceable member and said drawbridge plate to limit torque applied to said drawbridge plate.

11. A drawbridge assembly as set forth in claim 10, wherein said torque limiting means includes detent means permitting manual operation of said drawbridge plate independently of operation of said actuating means.

12. A drawbridge assembly as set forth in claim 11, including spring biasing means urging said drawbridge plate toward said retracted position, said spring biasing means being arranged to maintain said physically displaced member in contact with said traversing surface.

13. In an elevator system having a car movable in a vertical shaft, the car having a floor indexable with successive landings, and an automatic transfer device including a carriage movable in a horizontal plane for loading and unloading carts between the car and a landing, a drawbridge assembly including a plate adjacent the platform and an end of the car being loaded and unloaded, said plate being pivotal between a generally vertical retracted position and a generally horizontal extended position, said plate being pivotal about a horizontal axis perpendicular to a line of movement of said carriage, a rotary actuator for moving said plate between said extended and retracted positions in response to movement of said carriage, said actuator including a follower member disposed in the path of a surface fixed to said carriage, movement of said carriage causing said surface to displace said follower, linkage means between said follower member and said drawbridge for converting displacement of said follower member into pivotal movement of said plate, said linkage means including means to limit the forces applied to said plate upon extension movement thereof, said linkage means including means for extending said plate in a manner which accommodates variations in the relative level of said car floor and successive landings in an expected positional range.

* * * * *